Jan. 25, 1927.  1,615,815
C. R. BIRDSEY
APPARATUS FOR MAKING PLASTIC BUILDING MEMBERS
Filed March 20, 1922   3 Sheets-Sheet 1

INVENTOR.
C.R. Birdsey
BY
Langdon Moore
ATTORNEY.

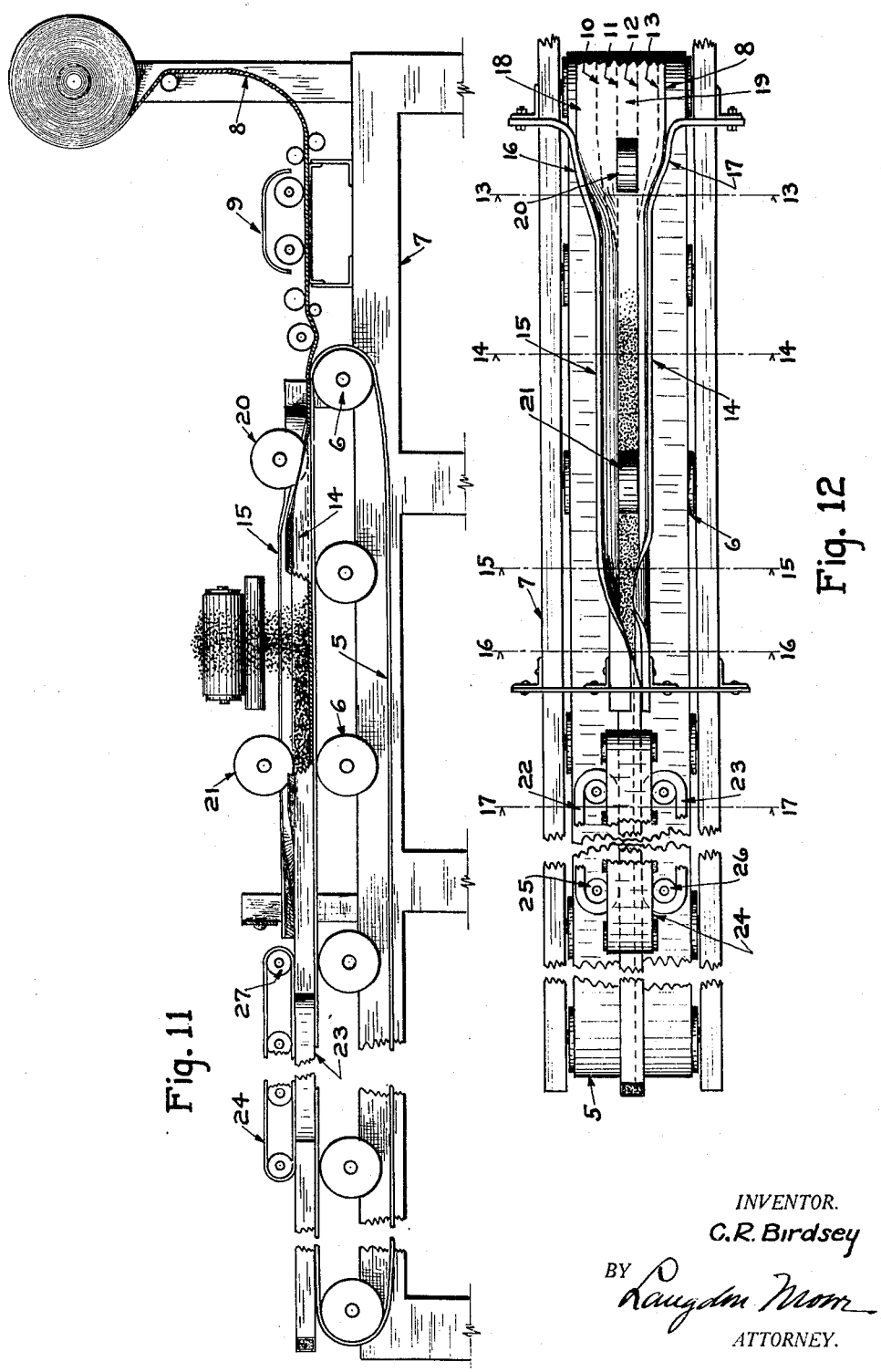

Jan. 25, 1927. 1,615,815
C. R. BIRDSEY
APPARATUS FOR MAKING PLASTIC BUILDING MEMBERS
Filed March 20, 1922 3 Sheets-Sheet 3

INVENTOR.
C. R. Birdsey
BY
ATTORNEY.

Patented Jan. 25, 1927.

1,615,815

UNITED STATES PATENT OFFICE.

CHARLES R. BIRDSEY, OF HINSDALE, ILLINOIS, ASSIGNOR TO UNITED STATES GYPSUM COMPANY, OF CHICAGO, ILLINOIS, A CORPORATION OF ILLINOIS.

APPARATUS FOR MAKING PLASTIC BUILDING MEMBERS.

Application filed March 20, 1922. Serial No. 545,232.

This invention relates to improvements in building material and more particularly to rectangular plaster structural building members and the method and apparatus for making the same.

It has been demonstrated that plaster board comprising a body of plaster-of-Paris or calcined gypsum having a paper or other suitable fibrous covering adhering to the faces thereof can be produced and when so constructed will have sufficient tensile strength on account of the fibrous covering to be satisfactorily transported and handled for application to the studding of buildings in the place of wooden laths, forming a substitute to receive the plaster to finish the wall, or the more recently developed plaster wallboard when applied may be painted or papered without first being plastered. Such a plaster board is fire and damp proof and is not affected by changes in atmosphere or temperature, however, when applied to opposite sides of studding to form a partition, the partition as a whole is not fireproof on account of the wooden studs enclosed between the walls.

It is an object of this invention to provide fiber covered plaster structural building members to be used preferably in the erection of plaster board or wallboard partitions between fireproof floors and ceilings, and the partition so constructed will in its entirety be fireproof as well as damp proof, although such structural members may be used to advantage in other places.

It has been attempted to construct building members of wood about which stucco or plaster has been cast to protect the wood, with the woden portion forming a nailing base for the attachment of nails driven through laths or plaster board, but on account of the shrinkage or expansion of the wood have not been commercially successful. It has been found that rectangular building structural members having a body or core of calcined gypsum or plaster-of-Paris completely encased in a covering of fibrous material will afford as good a base for holding nails as wooden timbers and possess sufficient tensile strength for the purpose employed.

While the preferred forms of this invention are illustrated on the accompanying sheets of drawing, yet minor detail changes may be made without departing from the scope thereof.

Figures 4 to 10 inclusive are similar views illustrating different modifications for arranging the meeting edges of the cover sheet.

Figure 11 is a view in side elevation, with parts broken away, of the forming end of a machine contemplated to produce this improved rectangular plaster structural building member.

Figure 1:
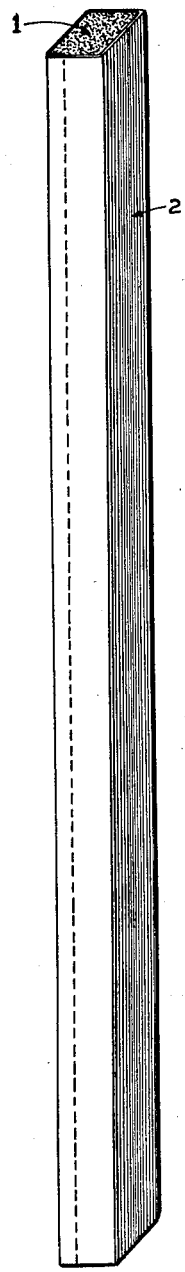
Figure 1 is a view in perspective, with parts broken away, of a rectangular plaster structural building member, as provided in accordance with this invention.

Figure 12 is a top plan view of Figure 1, with parts broken away.

Figures 13 to 17 inclusive are views in section taken on the lines 13—13, 14—14, 15—15, 16—16, and 17—17, respectively, on Figure 12.

Figure 2:
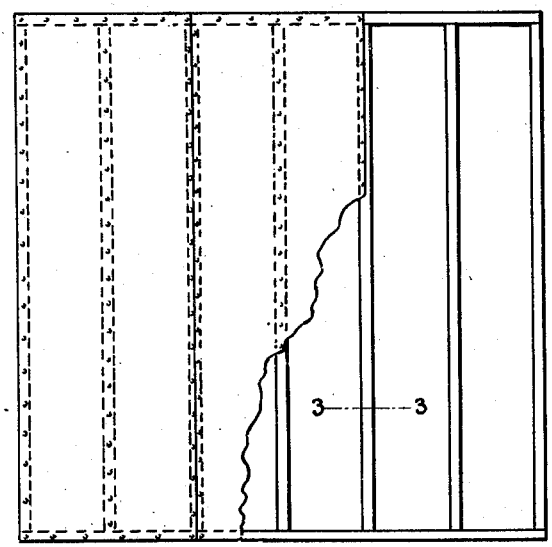
Figure 2 is a view in elevation illustrating the application of this improved member in erecting a wall or partition.
Figure 3:
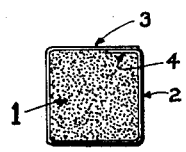
Figure 3 is a view in section taken on the line 3—3 of Figure 2.

In erecting a partition or finishing the interior of a wall with plaster it is customary to lay a timber at the desired place and secure it to the floor with a corresponding timber secured to the ceiling directly thereabove and provide a plurality of equally spaced vertical studs therebetween and secured thereto to which wooden laths or plaster boards are nailed. In accordance with this invention structural building members of standard sizes for this purpose are provided with a plaster body encased within an adhering fibrous covering, as will hereinafter be described, which may be as readily cut in proper lengths by a saw and secured in place by nails as the ordinary wooden timbers used for this purpose and to which the plaster boards may be nailed. Such a member is shown in Figure 1 and its application for the purpose described is illustrated in Figure 2.

The body 1 of the rectangular plaster structural building member is preferably of calcined gypsum mixed with sawdust and the covering 2 of stout paper or other suitable fibrous material. The body as shown is rectangular in cross section and is covered by a single covering sheet the longitudinal edges 3 and 4 of which extend in the direction of the length of the member and are overlapped or otherwise brought together and secured to each other and, as in accordance with this invention the body is applied in plastic condition to the covering and covering and body shaped in the desired form of the member the same time, the covering will be bonded to the body and the edges of the covering to each other.

The apparatus employed to form this fiber covered rectangular plaster structural building member comprises an endless belt 5 or similar conveyor traveling over suitable pulleys 6 mounted on a frame or table 7. A sheet of paper 8 or other suitable fibrous material is fed upon the conveyor from a supply roll 8, which sheet is preferably slightly greater in width than the circumference of the member to be formed. As the sheet approaches, the adjacent end of the conveyor, or as it first rests thereon, it passes through a scoring device 9 which slightly scores the upper side of the sheet in four lines 10, 11, 12, and 13 which will later form the four corners of the member. Since scoring devices of this character are old for this purpose, it is not thought necessary to further illustrate or describe this part of the machine.

As the scored sheet progresses upon the conveyor it passes between folding members 14 and 15 arranged on opposite sides of the table which are provided with arms 16 and 17 that pick up the edges 18 and 19 of paper at the same time and turn or fold the sheet from a flat to an inclined position along the two scored lines 11 and 12 adjacent the center of the sheet. As the edges 18 and 19 of the sheet assume the inclined position it is preferable to provide a suitably mounted roll 20 adapted to enter between the sides of the folding members and sheet edges to travel over the trough formed in the sheet and maintains its bottom in flat contact with the conveyor. The folding members maintain the edges of the sheet in an inclined and then in an upright position as it travels between them a sufficient distance to allow calcined gypsum or stucco in a plastic condition to be deposited in the trough formed by the sheet. It is preferable to provide a conveyor for receiving the stucco and discharging it in a plastic state into the trough. It is not considered necessary to further illustrate this conveyor as it forms no part of this invention and as devices of this character are old in the art.

After the stucco has been deposited the folding member 14 is constructed to turn up the edge of the sheet passing against and then downward along the line of the upper scoring so it will fold over the body of the stucco parallel to the bottom of the sheet resting on the conveyor. The rate of discharge of the stucco and the rate of travel of the conveyor are timed and arranged that just before this edge is folded over the height of the body of the stucco in the trough will be approximately in line with the upper scored lines on the upstanding edges of the sheet. If desired a roll 21 may be suitably mounted to enter between the folding members and edges of the sheet to prevent the stucco exceeding this heighth. After the top of one edge of the sheet has been folded over the body of the stucco the opposite folding member 15 is constructed to turn the inclined edge traveling thereagainst up straight and then bend it along the upper scored line 13 on that edge so that it will fold down over the stucco body and other folded edge until it is parallel with the bottom of the sheet resting on the conveyor.

It is preferable to control the height of the stucco body within the sheet so that as the conveyor causes it to pass under the last folding of the sheet sufficient stucco will flow between the contacting surfaces of the folded over tops of the edges of the sheet to bond them to each other. The folding members extend the same distance on each side of the table from the place where they first pick up the edges of the sheet until the last fold is completed and therefore shape the plastic body as well as accomplish its encasement with the fibrous covering. Since the time of passage of the paper and plastic body through the forming members is not sufficient for the stucco to set enough to maintain the shape imparted to it or completely bond the covering, additional means are provided for this purpose which preferably comprise endless belts 22, 23, and 24, passing over suitably mounted guide rollers, 25, 26 and pressure rollers 27 respectively, that will contact with the opposite sides and top of the encased plaster member issuing from between the folding members and advancing on the conveyor, which belts extend in the direction of travel a great enough distance to allow the plastic body to set sufficiently to maintain its shape and the top belt 24 is sufficiently near the end of the folding members to fold down the top edges 18 and 19 of the sheet and exert pressure upon them until they are bonded. The conveyor is of such length that when the plaster member has reached the end it has acquired sufficient solidity to be cut in the desired lengths and be transported, without deforming, to the kiln where the set is completed and excess moisture removed to form the finished product.

Figure 4:
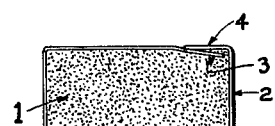
Figure 5:
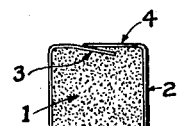
Figure 6:
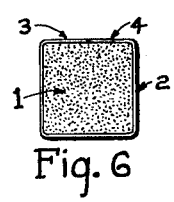
Figure 7:
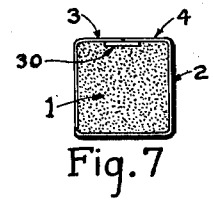
Figure 8:
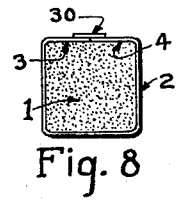
Figure 9:
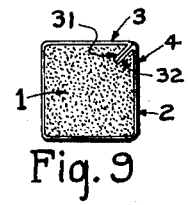
Figure 10:
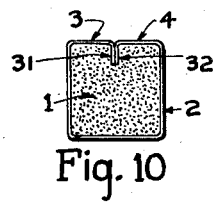
Figure 13:
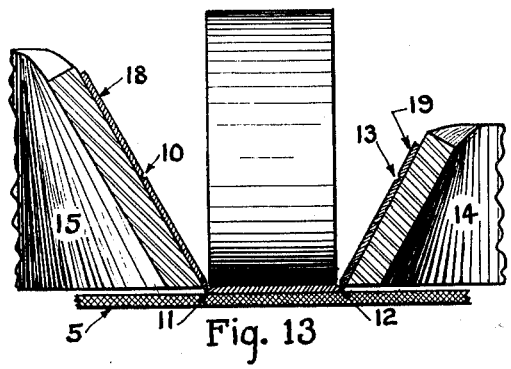
Figure 14:
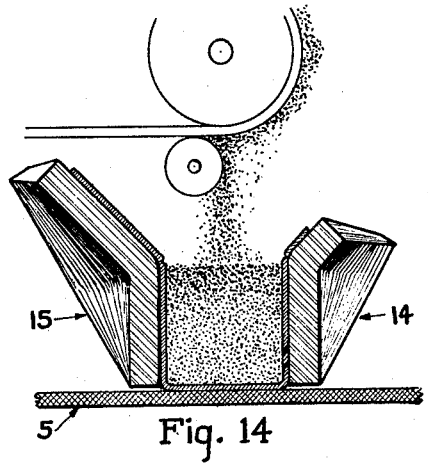
Figure 15:
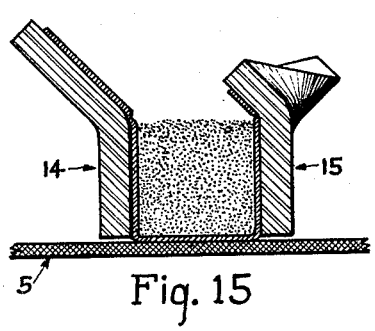
Figure 16:
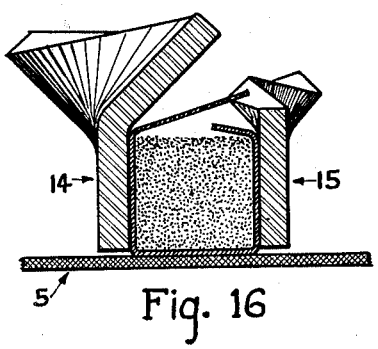
Figure 17:
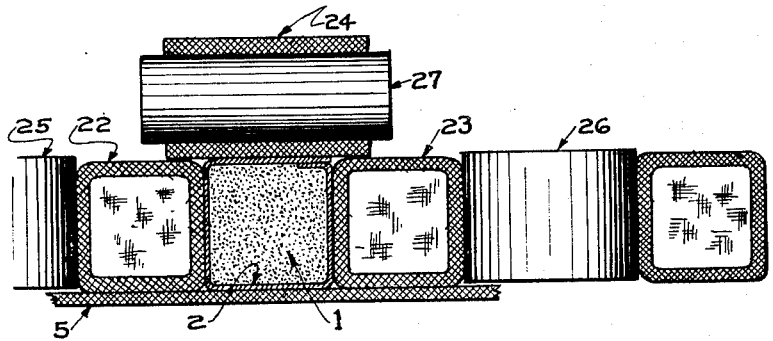

While the machine illustrated scores the paper so that there is a fifth division of less width than the others which is first turned and then folded over the body with the other side of the sheet overlapping to the scored edge, the time of making the folds may be interchanged by the arrangement of the respective folding members so that the narrow fifth section of the sheet may be folded over the top of the other edge, as shown on Figure 4, or, if desired, without departing from the scope of this invention, the sheet may be so scored and the folding members so arranged that the top edges of the sheet may be overlapped at the longitudinal center of the top of the plastic body, as shown on Figure 5, or may be caused to meet without overlapping, as shown on Figure 6, and, if desired, in the latter case an additional narrow strip 30 of the covering material may be fed upon the top of the plastic body before the folds are made which will bond the meeting edges to each other, as shown on Figure 7, and likewise the strip 30 may be applied on the outer side and cover as well as bond the meeting edges, as shown on Figure 8. The edges 3 and 4 may have extensions 31 and 32 which may be turned in at one corner, as shown on Figure 9, or may be turned inward, as shown on Figure 10, when they meet along the longitudinal center, so that the turned in portions are anchored in the plastic body. The changes in construction to accomplish these modifications are so obvious from the description already made of the folding mechanism that further description or illustration is not deemed necessary for a complete understanding.

What I claim is:

In a machine for producing rectangular structural weight supporting and fire resisting plastic building members substantially square in cross section, the combination with an endless conveyor of a sheet of fibrous material fed continuously thereto and advanced thereby, means for scoring the sheet in four parallel lines as it passes thereunder, stationary folding means arranged on each side of the sheet comprising pickup arms, adapted to turn up the edges of the sheet upward along the lines of scoring adjacent the center of the sheet, with portions extending in the direction of travel of the conveyor adapted to engage the turned up edges of the sheet and maintain them in an upright position as the sheet advances between them, a roller mounted between the folding means adapted to engage the portion of the sheet between the turned up edges and maintain it upon the conveyor as the sides are being turned up by the pickup, means for depositing plastic material on the central portion of the sheet between the turned up sides, means for regulating the height of such deposit, means on the opposite folding members to turn over the sides of the sheet along the lines of scorings adjacent the edges and fold such portions over the plastic deposit and engage the same, means for maintaining the folds of the sheet in contact with the plastic body enclosed thereby and maintaining the angular relation of the sides after the formed member advances through the folding members, said means comprising endless belts arranged to contact with the sides and top of the member and travel therewith as it advances on the conveyor.

CHARLES R. BIRDSEY.